US010940564B2

(12) United States Patent
Reiz et al.

(10) Patent No.: US 10,940,564 B2
(45) Date of Patent: Mar. 9, 2021

(54) METHOD FOR DETECTING WELD SEAM GEOMETRY

(71) Applicant: Georg Fischer Rohrleitungssysteme AG, Schaffhausen (CH)

(72) Inventors: Robert Reiz, Stühlingen (DE); Edin Hasific, Schaffhausen (CH)

(73) Assignee: Georg Fischer Rohrleitungssysteme AG

( * ) Notice: Subject to any disclaimer, the term of this patent is extended or adjusted under 35 U.S.C. 154(b) by 0 days.

(21) Appl. No.: 16/293,713

(22) Filed: Mar. 6, 2019

(65) Prior Publication Data

US 2019/0308277 A1 Oct. 10, 2019

(30) Foreign Application Priority Data

Apr. 5, 2018 (EP) ..................................... 18165805

(51) Int. Cl.
*G01N 21/952* (2006.01)
*B23K 31/12* (2006.01)
(Continued)

(52) U.S. Cl.
CPC .......... *B23K 31/125* (2013.01); *B23K 9/0282* (2013.01); *B29C 65/1412* (2013.01);
(Continued)

(58) Field of Classification Search
CPC ............... B23K 31/125; B23K 9/0282; B29C 65/1412; B29C 65/1432; B29C 65/20;
(Continued)

(56) References Cited

U.S. PATENT DOCUMENTS 5,168,141 A * 12/1992 Tashjian ................. B23K 26/04
219/121.63
9,402,036 B2 * 7/2016 Bishop ............... G01N 21/8806
(Continued)

FOREIGN PATENT DOCUMENTS

EP        2963380 A1    1/2016
JP    2000-289115 A    10/2000

OTHER PUBLICATIONS

U.S. Appl. No. 16/299,921, filed Mar. 12, 2019, Robert Reiz et al.

*Primary Examiner* — Jessica M Prince
(74) *Attorney, Agent, or Firm* — Harness, Dickey & Pierce, P.L.C.

(57) ABSTRACT

A technique for sensing a weld seam geometry of a plastic butt weld seam, preferably plastic pipes, including:
  manual positioning of an optical sensor in relation to a butt weld seam between pipeline components, preferably plastic pipes, wherein the sensor is aligned approximately perpendicularly to the pipe centre axis,
  automatic approaching of the sensor of measurement positions along or around a sensor axis,
  acquiring the visible weld seam geometry and/or the data by means of the sensor in each approached measurement position,
  determining the optimum measurement position by way of the acquired data, preferably by means of an algorithm,
  automatic approaching of the sensor of the optimum measurement position along or around the sensor axis,
  acquiring the weld seam geometry to determine the quality of the weld seam,
  analyzing and judging the measurement of the acquired weld seam geometry at the optimized measurement position.

10 Claims, 5 Drawing Sheets

Figure 1:
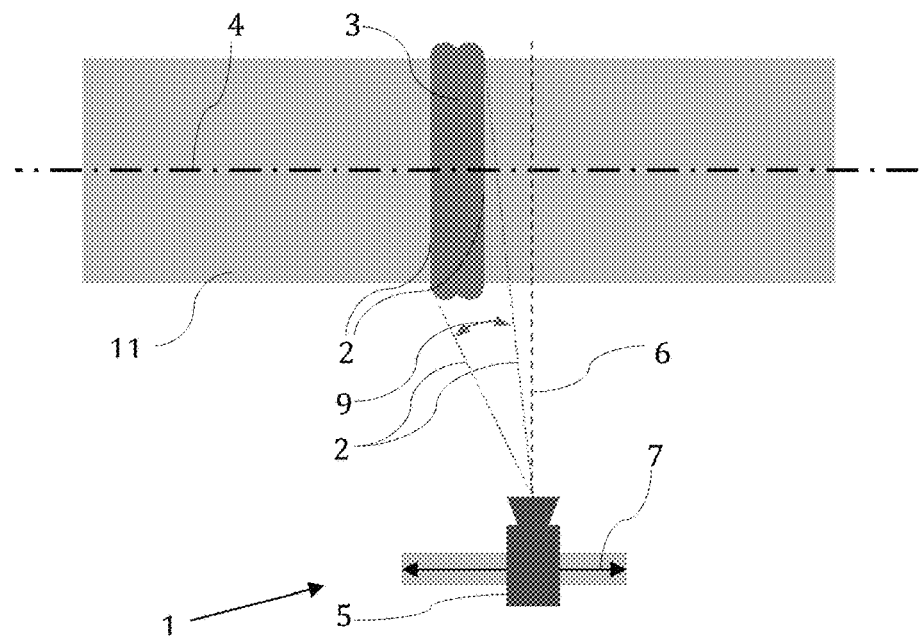

(51) Int. Cl.
  *B23K 9/028* (2006.01)
  *H04N 7/18* (2006.01)
  *B29C 65/20* (2006.01)
  *B29C 65/14* (2006.01)
  *B29C 65/82* (2006.01)
  *B29C 65/00* (2006.01)
  *G01B 11/27* (2006.01)
  *G01B 11/02* (2006.01)
  *G06T 7/00* (2017.01)

(52) U.S. Cl.
  CPC .......... *B29C 65/1432* (2013.01); *B29C 65/20* (2013.01); *B29C 65/8253* (2013.01); *B29C 66/1142* (2013.01); *B29C 66/5221* (2013.01); *B29C 66/73921* (2013.01); *B29C 66/974* (2013.01); *G01B 11/02* (2013.01); *G01B 11/27* (2013.01); *G01N 21/952* (2013.01); *H04N 7/185* (2013.01); *G06T 7/0006* (2013.01)

(58) Field of Classification Search
  CPC ............. B29C 65/8253; B29C 66/1142; B29C 66/5221; B29C 66/73921; B29C 66/974; G01B 11/02; G01B 11/27; G01N 21/952; G06T 7/0006; H04N 7/185
  USPC .......................................................... 348/90
  See application file for complete search history.

(56) References Cited

U.S. PATENT DOCUMENTS

| | | | |
|---|---|---|---|
| 2003/0091355 A1* | 5/2003 | Jeschonek | G03G 15/5041 399/49 |
| 2004/0244509 A1 | 12/2004 | Savitski | |
| 2016/0003751 A1* | 1/2016 | Reiz | G01N 21/952 356/237.2 |
| 2016/0320266 A1 | 11/2016 | Kimpel, Jr. et al. | |
| 2018/0005364 A1* | 1/2018 | Meeks | G06K 9/00134 |

* cited by examiner

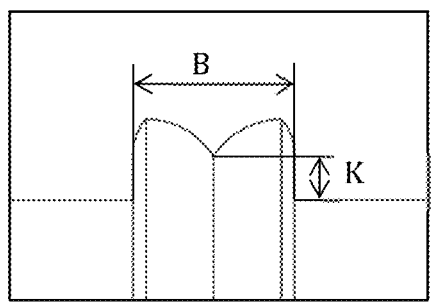
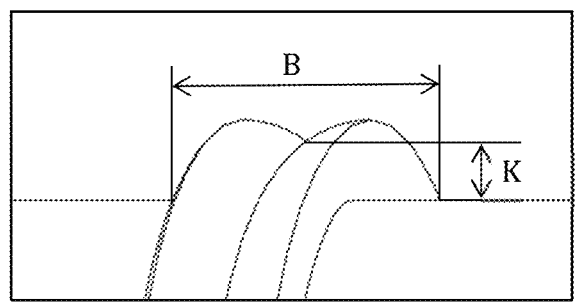
Fig. 3a
Fig. 3b
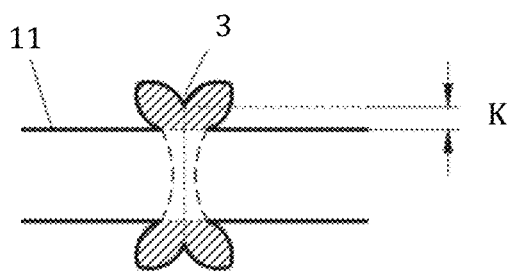
Fig. 4

METHOD FOR DETECTING WELD SEAM GEOMETRY

CROSS-REFERENCE TO RELATED APPLICATION

This application claims the benefit and priority of EP 18 165 805.5 filed Apr. 5, 2018. The entire disclosure of the above application is incorporated herein by reference.

FIELD

The invention relates to a method and a device for sensing a weld seam geometry of a plastic butt weld seam between pipeline components, preferably plastic pipes, wherein the device contains an optical sensor and a carrier device, wherein the carrier device has a drive and a sensor axis for positioning the sensor.

BACKGROUND

Checking a butt weld is used for the quality control of the weld. It does not play any role here with which method the pipes and/or fittings were butt welded, whether it is by means of a contactless IR welding method, by means of the classic butt welding method by touching the heating element, or another method. In accordance with the pipes and/or fittings to be welded, i.e., their dimensions, their plastic, the welding technology which is applied, etc., a weld seam has to have a specific shape and/or size, which can be optically checked. Corresponding thereto, guidelines and/or norms exist, which define precisely how a seam has to appear and/or what the permissible dimensions have to be with respect to the pipe and/or fitting properties and welding properties, so that they correspond to the requirements. A manual optical judgement by a competent technician has heretofore usually been carried out, who compares and judges the resulting weld seam on the basis of the norms and guidelines known to him.

It is disadvantageous in this case that judgements by a technician are very time-consuming and thus very costly. Moreover, such a judgement is also not consistently equal, since the human factor plays an essential role and the checking is not always carried out by the same technician.

JP 2000289115A discloses a check of a weld of plastic pipes by means of an ultrasound sensor, whereby a statement with respect to the fusing of the pipe wall in the interior, which is not visible, can also be achieved.

This check has the disadvantage of high expenditure, since such a check is very time-consuming, because the placement of the ultrasound sensors and/or the weld seam in relation to the ultrasound sensors has to be performed very precisely, which requires a long configuration time.

EP 2 963 380 A1 discloses a device for checking a butt weld, wherein this check is generally performed directly in the device in which the pipe was welded and thus precise alignment of the weld seam in relation to the sensor is no longer necessary.

It is disadvantageous in this case that the check can only take place directly after the welding and cannot be performed in a separate, possibly later check, since subsequent chucking in the device and corresponding alignment are hardly possible.

SUMMARY

This section provides a general summary of the disclosure, and is not a comprehensive disclosure of its full scope or all of its features.

It is an aspect of the invention to propose a method and a device linked thereto, which permit an optical check of a butt weld seam to be carried out rapidly and easily by being able to avoid accurate positioning of the weld seam in relation to the sensor.

This aspect is achieved according to the invention in that the method for sensing a weld seam geometry of a plastic butt weld seam between pipeline components, preferably plastic pipes, includes the following steps:

rough, manual positioning of an optical sensor in relation to a butt weld seam between pipeline components, preferably plastic pipes, preferably at the pipe external diameter, wherein the sensor is aligned approximately perpendicularly to the pipe centre axis, automatic and/or autonomous approaching of the sensor of measurement positions along or around a sensor axis, acquiring the visible weld seam geometry and/or the data by means of the sensor in each approached measurement position, determining the optimum measurement position by way of the acquired data, preferably by means of an algorithm, automatic and/or autonomous approaching of the sensor of the optimum measurement position along or around the sensor axis, acquiring the weld seam geometry to determine the quality of the weld seam, analyzing and judging the measurement of the acquired weld seam geometry at the optimized measurement position.

An optical sensor is roughly, manually positioned in relation to a butt weld seam which extends between the welded pipeline components, preferably plastic pipes. The optical sensor is preferably arranged directly on the pipe external diameter, for example, by means of a fastening ring or another simple fastening means. The sensor alignment is aligned approximately perpendicularly to the pipe axis, wherein a slight displacement can certainly be recorded by the sensor and/or independently corrected.

The sensor automatically and/or autonomously approaches measurement positions along and/or around a sensor axis, at which it acquires the weld seam and/or the weld seam width and/or the K dimension.

At the measurement positions, which are preferably defined via the controller, the sensor acquires the visible weld seam geometry. Due to the rough manual positioning of the sensor in relation to the weld seam, in order to enable an accurate analysis of the quality and/or the weld seam geometry, the sensor has to firstly find the optimum measurement position of the weld seam, at which the sensor is oriented directly and/or perpendicularly to the weld seam without lateral displacement and/or also without inclination of the sensor in relation to the weld seam. For this purpose, at least three measurement positions are approached and the corresponding weld seam geometries are acquired, preferably in each case the weld seam width and/or the K dimension.

The optimum measurement position is then preferably determined by means of an algorithm from the previously acquired data. The optimum measurement position is at the point at which the weld seam width or also the K dimension is the least, since no widening due to parallax results in the frontal top view of the weld seam, wherein it is sufficient if only the widths or the K dimensions are acquired to determine the optimum measurement position.

On the basis of the determined, optimum measurement position, the sensor travels along or around the sensor axis into this optimum measurement position.

It again acquires the weld seam geometry there, which is then used for the analysis and judgement of the quality and the dimensional accuracy of the weld seam. The analysis and judgement are preferably carried out by means of the controller and are based on predefined values, on the basis of which the recorded weld seam geometry is compared.

It is advantageous if, during the automatic and/or autonomous approach of the sensor of the measurement positions along or around the sensor axis, at least three measurement positions are approached to acquire the visible weld seam geometry. The optimum measurement position can thus preferably be determined by means of an algorithm. Of course, more measurement positions along or around the sensor axis are also possible. The two extreme positions each located on the very outside on the sensor axis are preferably approached and the weld seam geometry there, preferably the weld seam width and/or the K dimension, are/is acquired to be incorporated into the computation of the optimum measurement position, and the outer extreme positions upon pivoting of the sensor around the sensor axis are also approached.

It has been shown to be advantageous that the weld seam width and/or the K dimension are acquired by means of the sensor in each approached measurement position. These measured data are then used to determine the optimum measurement position, since the optimum measurement position is decisive for determining the weld seam geometry for the quality determination, since a correct recording of the weld seam without parallax and/or image distortion is only acquired in this position, in which the sensor is oriented linearly and/or perpendicularly to the weld seam.

According to one preferred embodiment, the algorithm determines the optimum measurement position by way of the acquired visible weld seam geometries and/or measured data, in particular by way of the acquired weld seam widths and/or the K dimensions, wherein the optimum measurement position is the position at which the smallest weld seam width and/or the smallest K dimension is present, since there is no image distortion. At the optimum measurement position, the sensor is oriented centrally and/or approximately perpendicularly to the weld seam, which prevents image distortion and permits an optimum recording of the weld seam geometry for quality control.

The algorithm for determining the optimum measurement position on the basis of the acquired data is preferably defined by a polynomial. The polynomial can extend exactly through the determined measured data and also approximately through the range of the measured data.

The optimum measurement position is preferably formed by the lowest point of the polynomial or by a measurement point which, on the basis of an approximating polynomial formation, is located lower than the lowest point of the polynomial and/or has a lower value.

It is advantageous if the automatic approaching of the sensor of measurement positions extends along a sensor axis which is aligned parallel to the pipe axis. The offset along the pipe axis of the sensor in relation to the weld seam and/or in relation to the optimum measurement position, thus in relation to the centre of the weld seam, can thus be determined by way of the known distance between the sensor and the pipe and the aperture angle which is present between one edge of the weld seam and the sensor, which forms an imaginary straight line, and the other edge and the sensor, which forms another imaginary straight line. However, at least three measurement points are required for this purpose.

An alternative embodiment of the method is that the sensor axis extends approximately perpendicularly to the pipe central axis, wherein the sensor is arranged so it is pivotable on the sensor axis. The sensor is preferably designed as a camera having a telecentric objective lens, which has a cylindrically extending field of vision. With this type of objective lens, the difference from a standard objective lens, which has a conical field of vision, is that it has a cylindrically extending field of vision. The weld seam thus does not necessarily have to be arranged in the center of the field of vision here as with a standard objective lens, but rather the objective lens has to be oriented perpendicularly to the weld seam and/or the optical axis of the objective lens has to be oriented perpendicularly to the pipe central axis.

This aspect is achieved according to the invention in that the sensor axis extends parallel or perpendicularly to the pipeline axis and the sensor is movable or pivotable along or around the sensor axis.

The device according to the invention for preferably carrying out the method for sensing a weld seam geometry of a plastic butt weld seam between pipeline components, preferably plastic pipes, has an optical sensor and a carrier device, wherein the carrier device has a drive and a sensor axis for positioning of the sensor. The sensor axis is aligned parallel or perpendicularly to the pipeline axis and the sensor is movable or pivotable and/or rotatable along or around the sensor axis.

It has proven to be advantageous if the device according to the invention is fastened directly on the pipe external diameter, for example, using a band or a ring on which the device is fastened and which is arranged on the pipe, wherein a support provided independently from the pipe for the device is also conceivable, into which the pipe can be inserted.

It has proven to be advantageous if the sensor is designed as a camera and has a normal or standard objective lens or a telecentric objective lens. If a telecentric objective lens is used, it is advantageous if a sensor axis extending perpendicularly to the pipe central axis is used, around which the sensor or the camera having a telecentric objective lens is pivoted, since a telecentric objective lens only has a linearly extending or cylindrical field of vision and thus the camera and/or the objective lens has/have to be aligned so it is pivotable in relation to the weld seam to reach the optimum measurement position and avoid image distortions. In contrast, with a standard objective lens, which has a conical field of vision, it is important, in order to avoid image distortions, that the weld seam is in the center of the field of vision, because of which the alignment is performed via a sensor axis extending parallel to the pipeline.

It is advantageous if the drive is designed as a stepping motor having a spindle, wherein linear motors are also conceivable. The complete procedure for acquiring the weld seam geometry and for its analysis lasts a few seconds, preferably between 1 and 20 seconds, wherein a performance especially preferably takes place in 1 and 12 seconds.

The drive preferably has a position sensing unit, which is preferably connected to a controller. It can thus be determined at which point the sensor is located and the optimum measurement position, which also runs via the position sensing, can be approached by means of the computations and the determined measured data.

All possible embodiments can be freely combined with one another, and the method features can also be combined with the device features.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
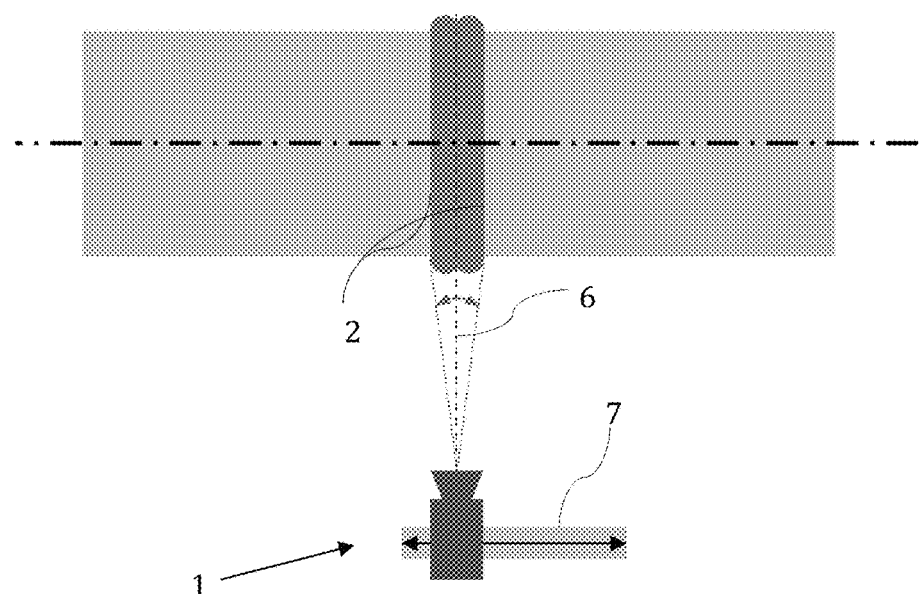
Figure 5:
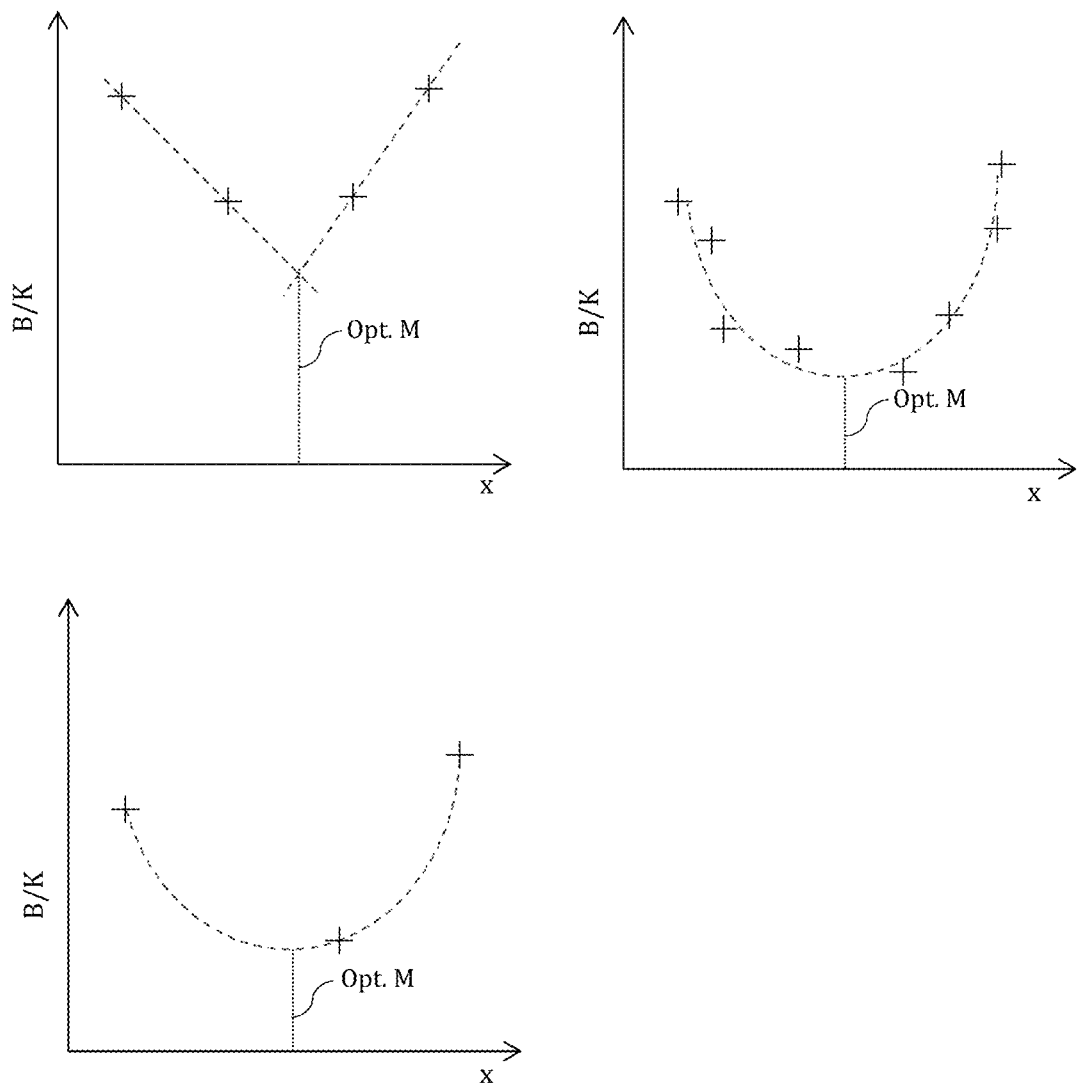
Figure 6:
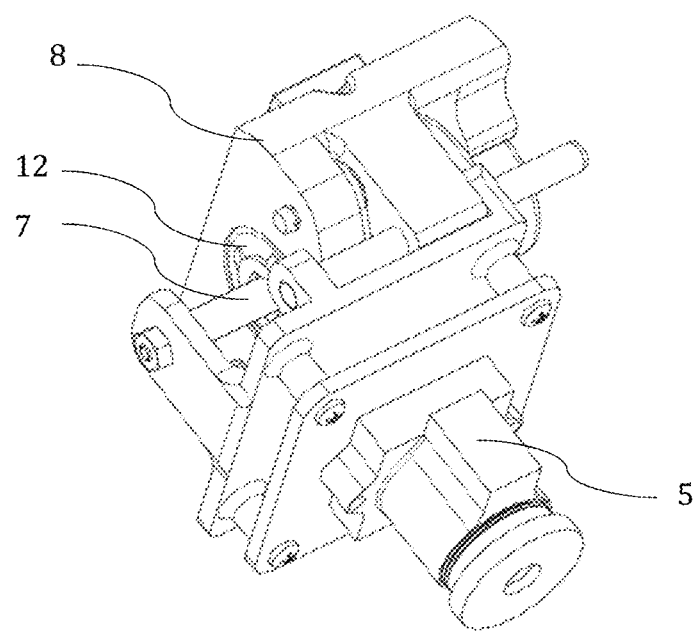
Figure 7:
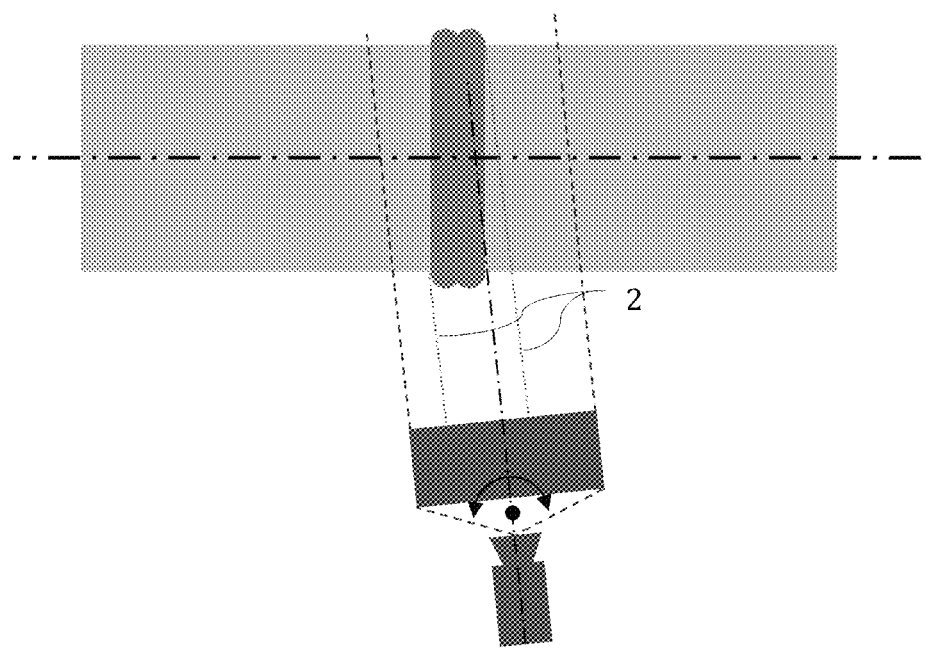
Figure 8:
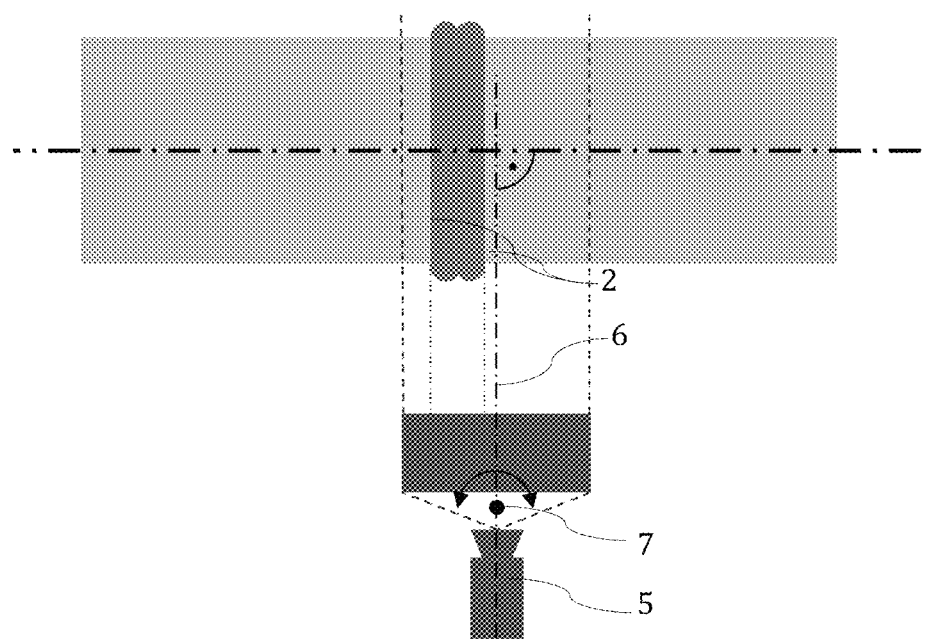

FIG. 1 shows a schematic illustration of the arrangements of the device according to the invention for carrying out the method according to the invention during the approach of measurement positions using a standard objective lens, FIG. 2 shows a schematic illustration of the arrangements of the device according to the invention for carrying out the method according to the invention in optimum measurement positions using a standard objective lens, FIG. 3a shows a recording of the sensor in an optimum measurement position, FIG. 3b shows a recording of the sensor in a measurement position for determining the optimum measurement position, FIG. 4 shows a longitudinal section through a pipe having a weld seam, FIG. 5 shows a schematic illustration of the acquired measurement position and an optimum measurement position thus determined, FIG. 6 shows a three-dimensional view of a device according to the invention, FIG. 7 shows a schematic illustration of the arrangements of the device according to the invention for carrying out the method according to the invention during the approach of measurement positions using a telecentric objective lens, and FIG. 8 shows a schematic illustration of the arrangements of the device according to the invention for carrying out the method according to the invention in optimum measurement positions using a telecentric objective lens.

DETAILED DESCRIPTION

Example embodiments will now be described more fully with reference to the accompanying drawings.

The drawing illustrated in FIG. 1 shows a schematic illustration of a device 1 according to the invention. In this position of the sensor 5, different positions along the sensor axis 7 are approached in order to acquire the weld seam geometry, preferably the weld seam width B and/or the K dimension K. The difference between the recorded images of the sensors 5 can be seen well from FIGS. 3a and 3b. FIG. 3b shows a recording in which the sensor 5 is not positioned at the optimum measurement position opt. M, i.e., centrally in front of the weld seam, and thus the resulting width B and the K dimension K are greater. Such recordings are recorded at at least three positions along the sensor axis 7, which is the minimum of acquired measured data to determine and/or compute the optimum measurement position. By way of the known distance of the sensor 5 from the pipe 11 and the aperture angle 9 of the objective lens and of the two acquired visible edges 2 of the weld seam 3, the weld seam width B and/or where the optimum measurement position opt. M can be recorded without distortion of the width and/or of the K dimension K results, which is then used for analyzing the weld seam quality.

It is shown in FIG. 2 when the sensor 5 is positioned in the optimum measurement position for recording the weld seam geometry, which is used for analyzing and judging the seam. It can be seen well that the sensor 5 and/or the optical axis 6 is/are oriented centrally to the weld seam, whereby a parallax can be avoided, which is relevant in the analysis and judgement of the weld seam quality.

FIG. 4 shows a welded pipe 11 in which the weld seam 3 is shown in sections in order to show which dimension, in addition to the weld seam width B, namely the K dimension K, is also used for determining the optimum measurement position. This dimension K can be determined separately instead of the width B, or also in combination.

FIG. 5 shows diagrams in which the determined measurement points for determining the optimum measurement position are shown as crosses. These were acquired during the approach to the different positions along the sensor axis, with which the optimum measurement position opt. M was then preferably determined on the basis of an algorithm. The vertical axis B/K shows the measured dimension of the width of the weld seam B or of the K dimension K of the weld seam and the horizontal axis shows the corresponding position x of the sensor on the sensor axis or the angle setting on the sensor axis.

In the first diagram, it is recognizable that the optimum measurement position opt. M can also be defined by the intersection of two straight lines, which can be determined on the basis of the measurement points.

Alternatively, the method is represented by means of a polynomial, which does not extend exactly through the measurement points but rather approximately through the measurement points. It can thus occur that a determined measurement point lies lower than the lowest point of the polynomial curve. In such a case, the lower single point is preferably used as the optimum measurement point opt. M, wherein the lowest point lies on the curve in the second diagram in FIG. 5 and the single point is arranged slightly higher. The last diagram in turn shows a polynomial curve which extends precisely through the measurement points.

In FIG. 6, the device 1 according to the invention is illustrated three-dimensionally, wherein it is shown independently of a pipe here. The device 1 has a carrier device 8 on which a drive 10 is arranged and which has a sensor axis 7 for accurate positioning of the sensor 5. The sensor 5 is preferably designed as a camera having a corresponding standard objective lens here, wherein a telecentric objective lens can also be used, but the arrangement of the sensor axis of the drive is then slightly changed.

The schematic figures shown in FIGS. 7 and 8 correspond to FIGS. 1 and 2 but with a telecentric objective lens instead of a standard objective lens. It is clearly apparent in this case that in a telecentric objective lens, the field of vision extends cylindrically and therefore an offset and/or an image distortion is/are corrected by a pivoting of the sensor 5 on the sensor axis 7, so that the optical axis 6 is then oriented perpendicularly to the pipe central axis 4 in the optimum measurement position opt. M. However, in this embodiment, the weld seam does not have to be located in the centre of the field of vision of the sensor.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for sensing a weld seam geometry of a plastic butt weld seam between adjacent pipes each having a central axis, comprising:
pre-positioning a sensor using the following steps (a)-(g):
- (a) positioning an optical sensor at a given position wherein-the sensor is displaced from the butt weld seam but where the sensor is aligned approximately perpendicularly to the pipe central axis,
- (b) automatically moving the sensor longitudinally along the pipe central axis from the given position to a first different measurement position displaced from the butt weld seam longitudinally along the pipe central axis,
- (c) acquiring visible weld seam geometry data by the sensor in the first measurement position,
- (d) automatically moving the sensor longitudinally along the pipe central axis from the first measurement position to a second measurement position;
- (e) acquiring visible weld seam geometry data by the sensor in the second measurement position,
- (f) determining an optimum measurement position (opt. M) by way of the acquired data at the first measurement position and the second measurement position,
- (g) automatically moving the sensor longitudinally along the pipe central axis to the optimum measurement position (opt. M), and
- (h) after the sensor has been moved to the optimum measurement position, then:
- (i) acquiring the weld seam geometry data from the sensor while remaining at the optimum measurement position to determine quality of the weld seam, and
- (j) analyzing and judging the measurement of the acquired weld seam geometry data at the optimum measurement position.

2. The method according to claim 1, wherein the sensor is moved to at least three different measurement positions to acquire visible weld seam geometry.

3. The method according to claim 1, wherein a weld seam width (B) and/or the K dimension (K) are acquired by the sensor in each measurement position.

4. The method according to claim 1, wherein an algorithm determines the optimum measurement position (opt. M) by way of acquired weld seam widths (B) and/or K dimensions (K), wherein the optimum measurement position (opt. M) is the position at which the smallest weld seam width (B) and/or the smallest K dimension (K) and no image distortion is present.

5. The method according to claim 1, wherein an algorithm for determining the optimum measurement position on the basis of the acquired data is defined by a polynomial.

6. The method of claim 1 wherein the sensor is moved to different measurement positions to capture information about sides of the weld seam.

7. A device for carrying out the method according to claim 1 containing an optical sensor and a carrier device, wherein the carrier device has a drive and a sensor axis for positioning of the sensor, wherein the sensor axis extends perpendicularly to the pipe central axis and the sensor is movable round the sensor axis.

8. The device according to claim 7, wherein the sensor is designed as a camera and has an objective lens.

9. The device according to claim 7, wherein the drive is designed as a stepping motor having a spindle.

10. The device according to claim 7, wherein the drive has a position sensing unit and is connected to a controller.

* * * * *